US005801801A

United States Patent [19]

Cnossen

[11] Patent Number: 5,801,801
[45] Date of Patent: Sep. 1, 1998

[54] DISTORTED-HELIX FERROELECTRIC LIQUID-CRYSTALLINE OPTICAL MODULATION DEVICE AND DISPLAY WITH ALIGNMENT LAYERS HAVING DIFFERENT ENERGIES

[75] Inventor: Gerard Cnossen, Eindhoven, Netherlands

[73] Assignee: U.S. Philips Corporation, New York, N.Y.

[21] Appl. No.: 731,625

[22] Filed: Oct. 15, 1996

[30] Foreign Application Priority Data

Oct. 16, 1995 [EP] European Pat. Off. ............. 95202785

[51] Int. Cl.$^6$ ................. G02F 1/141; G02F 1/13
[52] U.S. Cl. .................. 349/128; 349/135; 349/172
[58] Field of Search .............. 349/128, 85, 135, 349/172, 173

[56] References Cited

U.S. PATENT DOCUMENTS

| | | | |
|---|---|---|---|
| 4,662,721 | 5/1987 | Harada et al. | 239/128 |
| 4,882,207 | 11/1989 | Coates et al. | 349/128 |
| 4,902,106 | 2/1990 | Dijon et al. | 349/128 |
| 5,377,033 | 12/1994 | Radcliffe | 349/128 |
| 5,686,019 | 11/1997 | Nakamura et al. | 349/128 |

OTHER PUBLICATIONS

Proceedings of the SID, vol. 31/2 (1990), p. 119 ff.

*Primary Examiner*—William L. Sikes
*Assistant Examiner*—Kenneth Parker
*Attorney, Agent, or Firm*—John C. Fox

[57] ABSTRACT

The invention provides optical modulation devices and displays of the DHFLCtype having a high contrast. Said modulation devices comprise a first substrate and a second substrate which are positioned substantially parallel to each other and which are provided, on their facing surfaces, with, in succession, an electrode layer and an orientation layer. This advantageous effect is achieved by using different orientation layers, the surfaced energy of the orientation layer of the first substrate being different from the surface energy of the orientation layer of the second substrate, said difference in surface energy being at least 5 mN/m. The orientation layer having the high surface energy is preferably made from rubbed polyimide, and the orientation layer having the low surface energy is preferably made from unrubbed polyorganosilsesquioxane. The optically active layer of the modulation devices in accordance with the invention exhibits a "tilted-bookshelf" structure.

10 Claims, 5 Drawing Sheets

100μm

100μm

DISTORTED-HELIX FERROELECTRIC LIQUID-CRYSTALLINE OPTICAL MODULATION DEVICE AND DISPLAY WITH ALIGNMENT LAYERS HAVING DIFFERENT ENERGIES

BACKGROUND OF THE INVENTION

The invention relates to an optical modulation device comprising a first substrate and a second substrate which are positioned substantially parallel to each other and the facing surfaces of which are provided, in succession, with an electrode layer and an orientation layer, an optically active layer of distorted-helix ferroelectric liquid-crystalline material being present between the two substrates. The invention also relates to an DHFLC-display which comprises such a modulation device.

A modulation device of the type mentioned in the opening paragraph is known per se. For example, in Proceedings of the SID, Vol. 31/2 (1990), page 119 ff., a description is given of a ferroelectric display which comprises such a modulation device. Said modulation device includes an optically active layer composed of a mixture of the distorted-helix ferroelectric liquid-crystalline (abbr. DHFLC) materials FLC 5679 and FLC 5836 from Hoffmann La Roche. This material has been studied in commercially available. modulation devices whose optically active layer has a thickness of 2 microns. The substrates of the device are provided with orientation layers of a polymeric material, which are rubbed in parallel directions. During filling, the devices are heated. To improve the optical contrast of the device, the device comprising the DHFLC material is exposed to an a.c. voltage (30 Hz, 30 V) during the cooling process.

Ferroelectric materials of the DHFLC type differ in a number of respects from the more widely known surface-stabilized ferroelectric liquid-crystalline (SSFLC) materials. The latter materials exhibit a helix-like structure, and as the pitch of the helix is larger than the thickness of the optically active layer, the helix unwinds under the influence of interactions at the surfaces of the orientation layers (so-called "non helicoidal alignment"). DHFLC materials, however, are characterized by a helix-like structure with a small pitch which is smaller than the thickness of the optically active layer. DHFLC materials also exhibit a relatively high polarizability (generally above 50 nC/cm$^2$). The intermolecular interactions between the molecules of the DHFLC material are found to be much stronger than the interactions between the material and the orientation layers, so that the helix-like structure of the material in the optically active layer is preserved (so-called "helicoidal alignment"). Further, the DHFLC material exhibits a quasi-linear relation between the applied electric voltage and the resultant light response. By virtue of these properties, DHFLC materials are very interesting for use, particularly, in display devices.

From said publication it may be concluded that it is relatively difficult to homogeneously orient DHFLC material between the substrates of a modulation device. This is because such a modulation device has a large number of optical defects which manifest themselves in the form of line-like structures. These can be made visible by means of a polarizing microscope. These defects clearly have a negative influence on the optical performance of the modulation device. For example, in particular the contrast of the device is decreased to a relatively large degree.

OBJECTS AND SUMMARY OF THE INVENTION

It is an object of the invention to obviate the above drawbacks. The invention more particularly aims at providing an optical modulation device of the type mentioned in the opening paragraph, in which the DHFLC material is homogeneously oriented. The modulation device in accordance with the invention should also exhibit a relatively high contrast.

These and other objects of the invention are achieved by an optical modulation device of the type mentioned in the opening paragraph, which is characterized m that the surface energy of the orientation layer of the first substrate differs from the surface energy of the orientation layer of the second substrate, and in that said difference in surface energy is at least 5 mN/m. The difference is preferably at least 10 mN/m and, in accordance with a further preferred embodiment, at least 20 mN/m.

The invention is based on the recognition that the chevron-like shape of the so-called smectic layers in the optically active material is responsible for the poor optical performance of the known optical modulation device. Extensive experimental research has revealed that these structures are formed already in the manufacture of the modulation device. In particular the transition from the smectic A-phase to the smectic C-phase plays an important role.

When the DHFLC material is provided between the substrates of the known device, said material is heated so that it is in the isotropic or nematic phase. Subsequently it is cooled to room temperature. As a result, the material is converted, via the so-called smectic A-phase, to the so-called smectic C-phase. The smectic layers are formed in the smectic A-phase. The transition from the smectic A-phase to the smectic C-phase causes the molecules of the DHFLC material to tilt relative to the normal to the smectic layers. As a result, shrinkage in the smectic layers occurs. In this process, the so-called "cone" is formed. Due to the fact that the smectic layers are firmly anchored to the surface of the orientation layers of the device, this change leads to an undesired bent layer structure (chevron-like structure). At the area of the bend the helix is unwound so as to enable a continuous transition along said bend.

Local unwinding of the helix at the area of the bend leads to a local increase of the energy content of the system. This increase is reduced by the formation of contrast-reducing defects. In devices in accordance with the invention, the formation of bent layer structures is precluded, so that the contrast-reducing defects caused by said bent structures do not occur. By virtue thereof, the contrast of the device in accordance with the invention can be increased substantially.

The use of orientation layers having different surface-energy levels causes the smectic layers to be anchored to the orientation layer with the highest surface energy, so that the layers can move along the orientation layer with the lowest surface energy. By virtue thereof, the layers adopt the desired "tilted-bookshelf" structure and the undesired "chevron" layer structure is avoided. If identical orientation layers are used, the identical surface energy of both orientation layers will inhibit the smectic layers from moving on both orientation layers, so that chevron-formation takes place.

A preferred embodiment of the modulation device in accordance with the invention is characterized in that the orientation layer of the first substrate is made from a material having a high surface energy of at least 30 mN/m, and in that the orientation layer of the second substrate consists of a layer having a low surface energy of maximally 25 mN/m. In experiments it has been established that devices whose.

orientation layers correspond to these limit values yield good results in combination with currently used DHFLC materials. The number of undesired line-like defects is negligibly small in these devices. The contrast of devices in accordance with this preferred embodiment is relatively high, that is above 40. Consequently, the use of a.c. voltages during cooling of the DHFLC material can be dispensed with. Preferably, the orientation layer of the first substrate shows a minimum surface energy of 35 mN/m and the orientation layer of the second substrate shows a maximum surface energy of 22 mN/m are used. A further improvement of the contrast is achieved if the minimum surface energy of one orientation layer is at least 40 mN/m and the surface energy of the other orientation layer is maximally 20 mN/m.

For the orientation layer having the high surface energy use can be made of various materials. For example, anisotropy (preferably induced by rubbing) in layers of polymers, such as polyamide, polyetheramide, vinyl polymers, polyvinyl alcohol, polyvinyl acetate, polyetherimide or polyester. These polymers all have a surface energy of 25 mN/m or more. The orientation layer having the high surface energy is preferably made from rubbed polyimide. This type of orientation layer has a surface energy of approximately 45–55 mN/m. It can also be provided in a readily controllable manner. In addition, polyimide is advantageous because it has a relatively high glass-transition temperature, so that the induced anisotropy is preserved also when the device is used at relatively high temperatures. If the orientation layer of the polyimide also induces a pretilt angle in the liquid-crystalline material, a further reduction of the number of line-like defects is achieved.

For the orientation layer having the low surface energy various materials can be used, for example amorphous or isotropic layers of polymers, such as teflon, polysiloxane, polyorganosilsesquioxane or polyalkylsilane. These materials all have a surface energy below 25 mN/m. The orientation layer having the low surface energy is preferably made from unrubbed polymethylsilsesquioxane. This material has a surface energy of approximately 22 mN/m. It can be provided in relatively thick, homogeneous layers in a relatively simple manner.

The invention also relates to an DHFLC display. This display comprises an optical modulation device as described hereinabove as well as at least one polarizer and means for driving the optically active layer.

BRIEF DESCRIPTION OF THE DRAWINGS

These and other aspects of the invention will be apparent from and elucidated with reference to the embodiments described hereinafter.

In the drawings.

It is noted that, for clarity, the parts shown in the Figures are not necessarily drawn to scale.

DETAILED DESCRIPTION OF THE PREFERRED EMBODIMENTS

Figure 1:
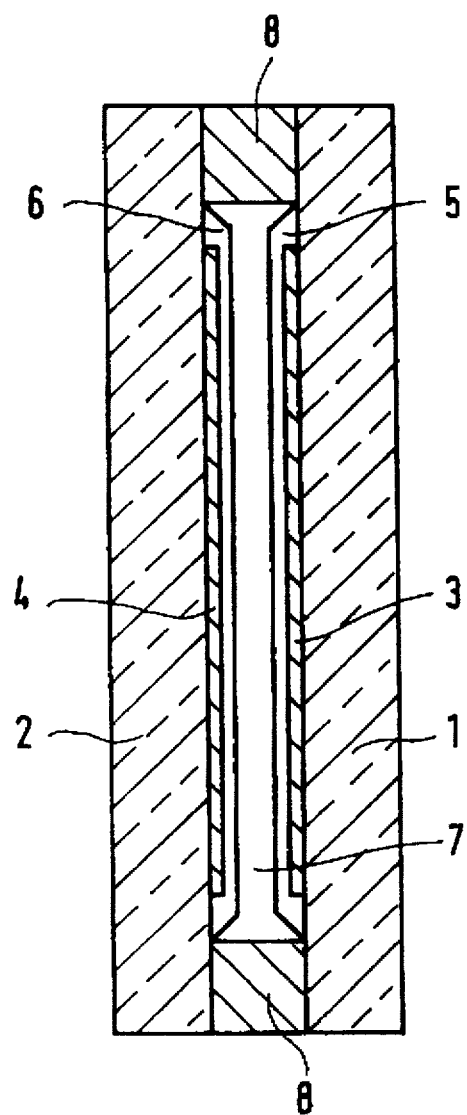
FIG. 1 shows an optical modulation device in accordance with the invention.

FIG. 1 schematically shows a sectional view of an optical modulation device in accordance with the invention. Said device comprises two substantially parallel substrates (1, 2) whose facing surfaces are provided, in succession, with an electrode layer (3, 4) and an orientation layer (5, 6). In the space between the orientation layers there is an optically active layer (7) of DHFLC material. The distance between the orientation layers ranges between 0.5 micrometer and 10 micrometers, preferably between 1 and 5 micrometers. This distance is maintained by the presence of spacers (not shown) in the optically active layer, for example in the form of small balls or fibres of glass. The space between the orientation layers is closed by means of closures (8). The electrode layer is made from a transparent electroconductive material, such as indium tin oxide (ITO). At least one of the substrates is transparent to the light used. Preferably, however, both substrates are transparent.

The orientation layer (5) of the first substrate (1) is made of a material whose surface energy differs from that of the material used for the orientation layer (6) of the second substrate (2). To achieve the effect of the invention, this difference should be at least 5 mN/m. A better effect is obtained if the difference is 10 mN/m. The best results are obtained if the difference is at least 20 mN/m.

The modulation device shown can be used as an optical shutter or an optical valve. In this case both substrates (1, 2) should be made from an optically transparent material such as a synthetic resin or glass, and the electrode layers (3, 4) are constructed as uniform layers extending over substantially the entire surface area of the substrate. If desired, the optical modulation device also comprises two optical polarizers (not shown). Said polarizers are preferably situated on the remote surfaces of the substrates.

Figure 2A:
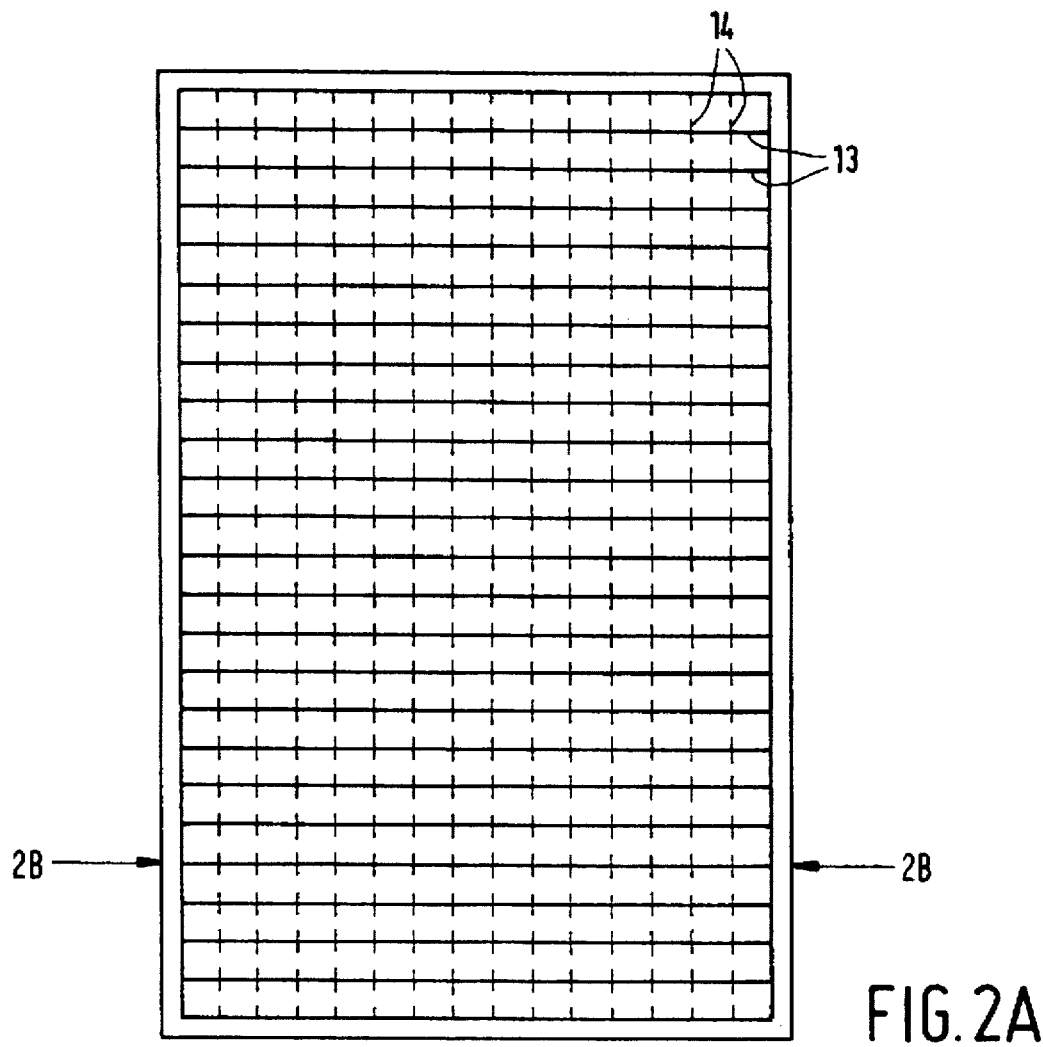
FIG. 2 shows an DHFLC display in accordance with the invention.
Figure 2B:
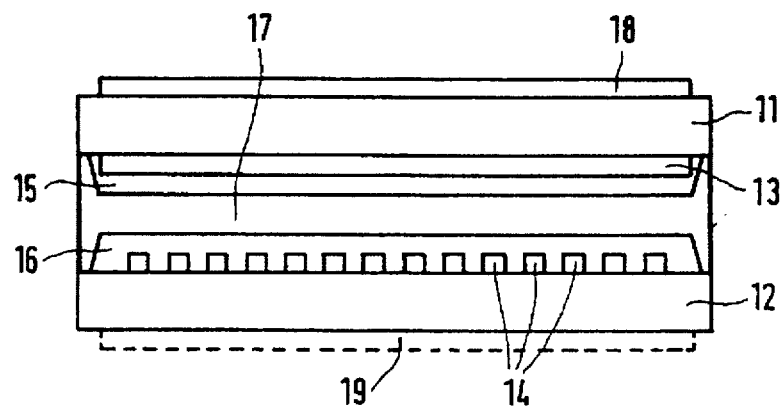

FIG. 2 schematically shows a DHFLC display in accordance with the invention, which comprises an optical modulation device as described in FIG. 1. FIG. 2-A is a plan view of said display. FIG. 2-B is a sectional view of the display taken on the line A—A' of FIG. 2-A. The display comprises two substrates (11,12) which are provided with transparent electrodes, for example, of ITO on the facing surfaces. This electrode matrix is composed of a number of rows (13) and columns (14) of electrodes which can be individually driven. Each picture element is preferably provided with a solid-state switch in the form of a thin-film transistor or a thin-film diode (not shown).

An orientation layer 15, 16 is present on the electrode layer of each substrate. The orientation layer (15) of the first substrate (11) is made from a material whose surface energy differs from that of the material used to manufacture the orientation layer (16) of the second substrate (12). To achieve the effect of the invention, this difference should be at least 5 mN/m. A better effect is obtained if the difference is 10 mN/m. The best results are obtained if the difference is at least 20 mN/m. In the space between the orientation layers there is an optically active layer (17) of DHFLC material.

The structure of the DHFLC material can be locally distorted via an electric field which can be locally applied and which can be generated with means (not shown) which are used to drive the optically active layer. Also in this case the space is closed by means of closures. The distance between the orientation layers, and hence the thickness of the optically active layer, is maintained by the presence of spacers (not shown) in the optically active layer, for example in the form of small balls or fibres of glass. The display also comprises one polarizer (18) or two polarizers (18, 19). If desired, the display further comprises a compensation foil (not shown) which serves to reduce the viewing angle dependence.

The DHFLC display in accordance with the invention can be driven both in the reflection mode and in the transmission mode. In the latter case, both substrates must be manufactured from an optically transparent material such as a synthetic resin or glass. In the case of a reflective display, a substrate may be made from a non-transparent material such as a plate of Si in which the electronics for actively driving the display is accommodated. In this case the display comprises a reflective electrode layer (for example of Al). If desired, also an insulation layer of an inorganic oxide or nitride (for example Si-oxide) is provided between the electrode layer and the orientation layer. In a reflective display of this type, a single polarizer is sufficient.

The effect of the invention will be described in greater detail by means of the following exemplary embodiments in accordance with the invention and comparative examples not in accordance with the invention. For this purpose, use was made of simple modulation devices in the form of cells. In these cells, in particular the types of liquid crystalline material and the types of orientation layers were varied. It was determined whether the DHFLC material of the cells produced had the desired "tilted-bookshelf" structure or whether undesired chevron structures were present. To this end use was made of two criteria, namely the X-ray diffraction pattern of the optically active layer and the type of line-like defects in the layer.

Figure 3A:
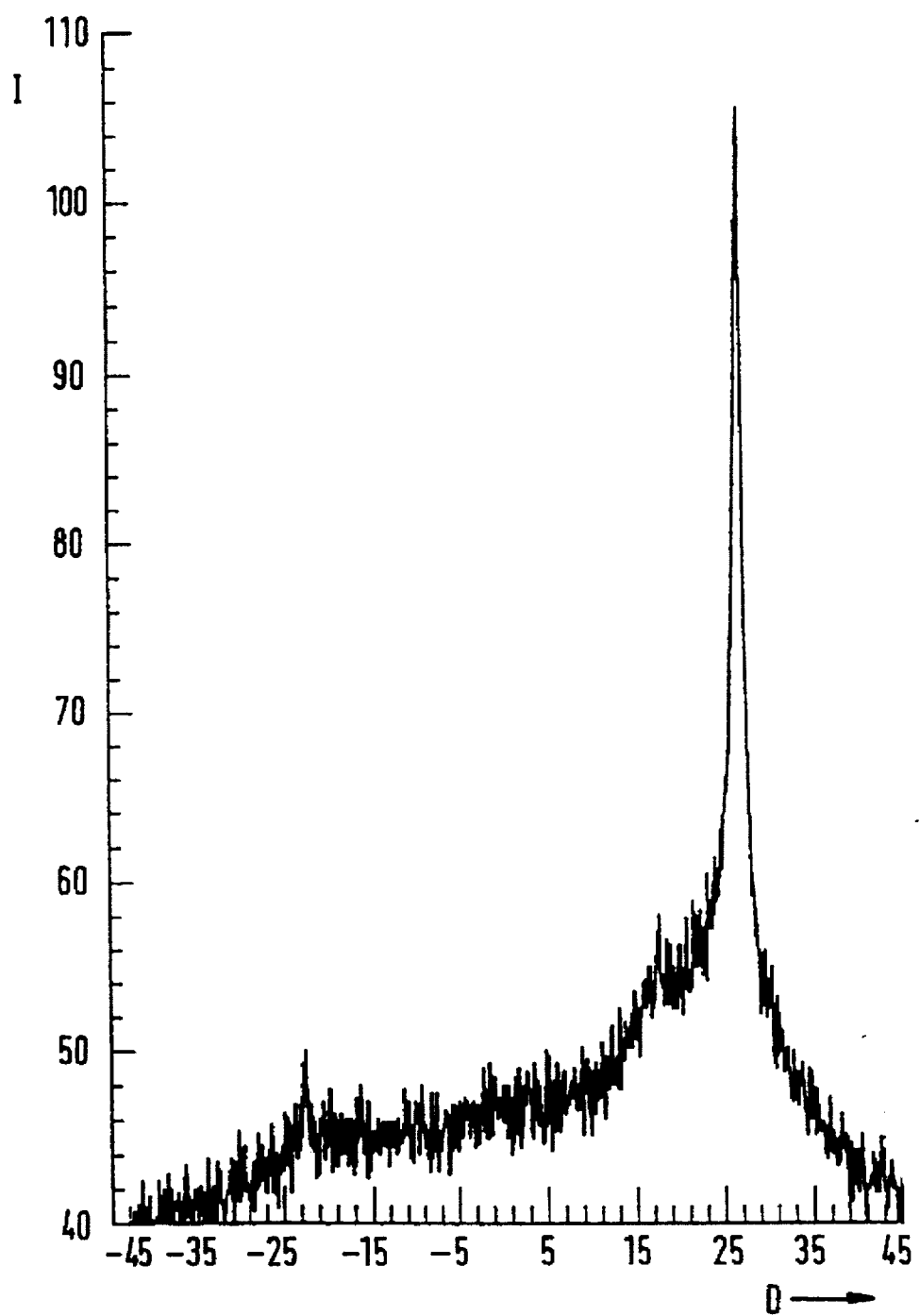
FIG. 3 shows the X-ray diffraction pattern of two optically active layers made from DHFLC material.
Figure 3B:
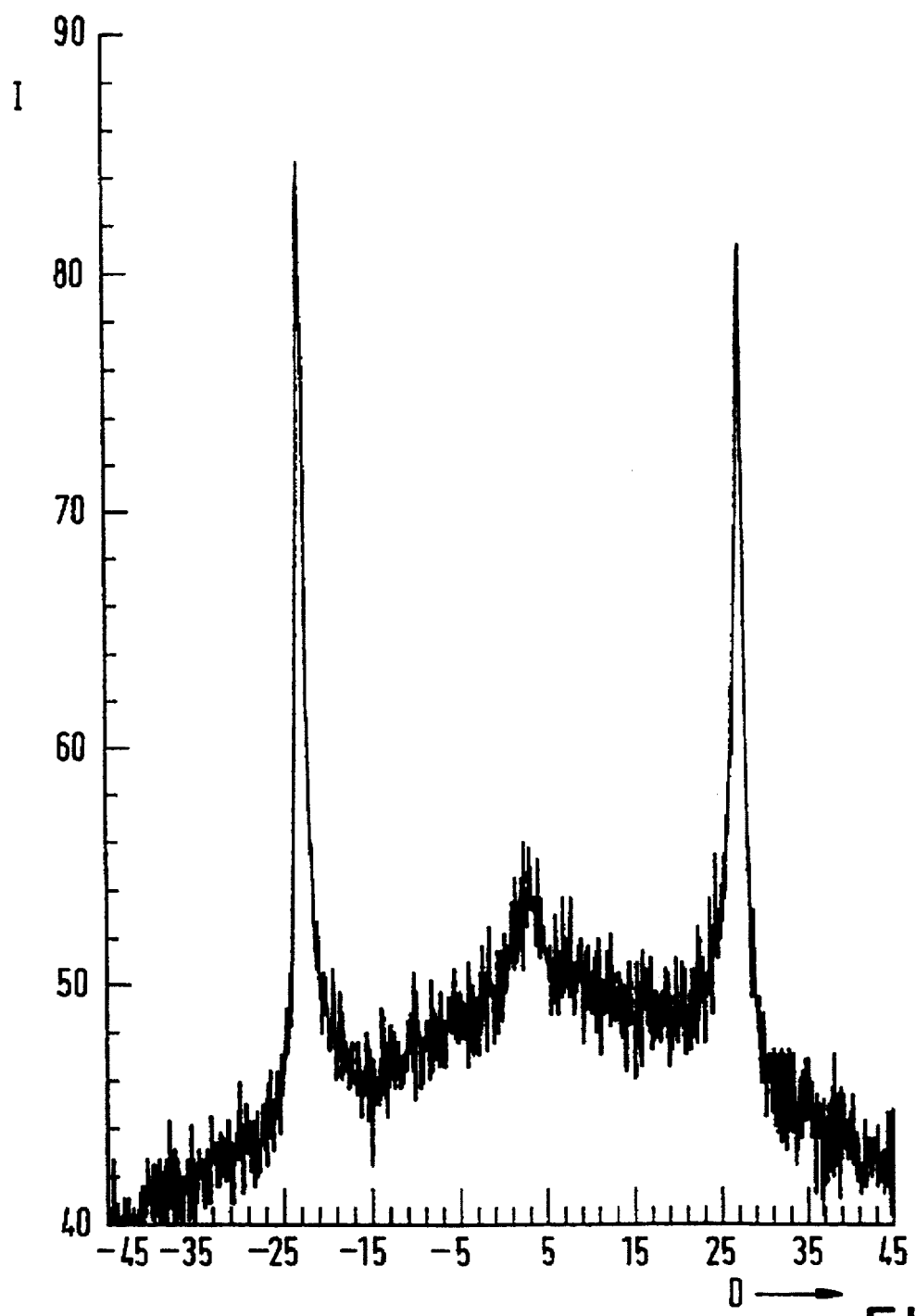

FIG. 3 shows two X-ray diffraction patterns, in which the intensity I (arbitrary unit) is plotted as a function of the angle of incidence D (o). The pattern of FIG. 3-A is obtained from measurements on the optically active layer of a cell in accordance with the invention, in which substantially all of the DHFLC material has the desired "tilted-bookshelf" structure. In this case, the pattern exhibits only one diffraction peak with a high intensity. FIG. 3-B shows a pattern which is obtained by measurements on the optically active layer of a cell which is not in accordance with the invention. It was found that an important part of the DHFLC material contained therein had the undesired chevron structure. The optically active layer of such cells exhibits two diffraction peaks with a high intensity and a wide peak with a low intensity, the latter peak being situated between the former peaks. The high-intensity peaks are caused by the chevron structure, while the wide peak is caused by the many defects in the optically active layer.

Figure 4A:
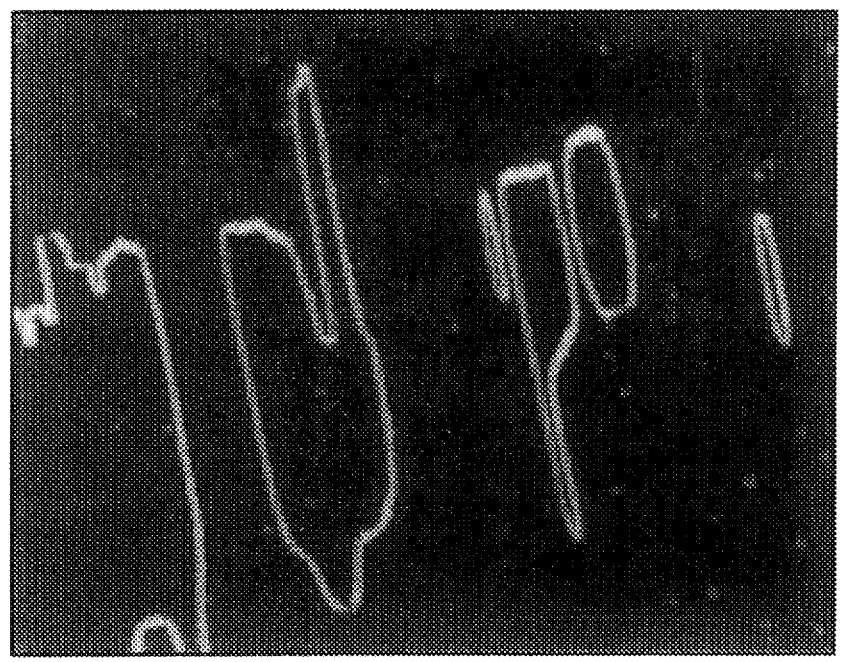
FIG. 4 shows the pattern of line-like defects of two optically active layers made from DHFLC material.
Figure 4B:
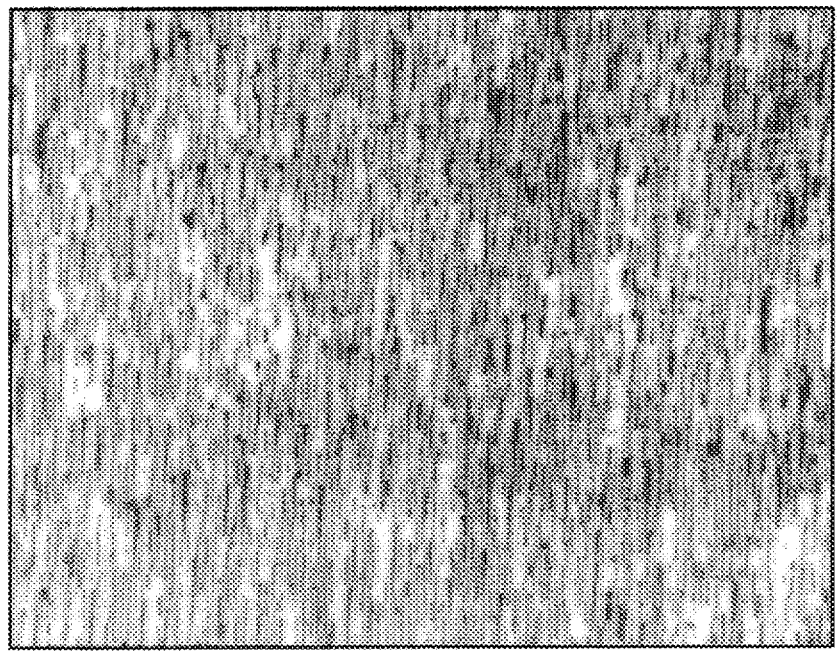

FIG. 4 shows a polarisation microscope image of the number of line-like defects in a cell in accordance with the invention (FIG. 4-A) and in a cell not in accordance with the invention (FIG. 4-B). The line-like defects measured on the cell in accordance with the invention form an enclosed area within which the tilt direction of the smectic layers is opposed to the tilt direction of the smectic layers in the surrounding area. The cell in accordance with the invention which corresponds to FIG. 4-A exhibits only a few line-like defects. Substantially all of the DHFLC material of this cell had the desired "tilted-bookshelf" structure. The cell which is not in accordance with the invention and which corresponds to FIG. 4-B exhibits very many line-like defects. An important part of the DHFLC material present in this cell had the undesirable chevron structure.

EXAMPLE 1

A first substrate was provided with a patterned electrode layer of ITO. Said substrate was subsequently coated with a 0.5 wt. % solution of polyhexamethylene adipamide (Nylon-6,6; Aldrich Chemical Co. Inc.) in methanoic acid. The substrate was spin coated at a rate of 1200 r.p.m. for 40 seconds and subsequently fired at a temperature of 75° C. for 16 hours. The 40 nm thick nylon-6,6 layer thus obtained was rubbed in one direction with a velvet cloth. The surface energy of this orientation layer was 46 mN/m. This value was determined by means of contact-angle measurements.

A second substrate, which was also provided with a patterned ITO electrode layer, was coated with a 6 wt. % solution of polymethylsilsesquioxane (ABCR GmbH & Co.) in 1-butanol (Aldrich Chemical Co. Inc.). The substrate was spin coated at a rate of 4000 r.p.m. for 20 seconds and subsequently fired at a temperature of 75° C. for 16 hours. The polymethylsilsesquioxane layer was not rubbed. The surface energy of this layer was 22 mN/m.

Both substrates were interconnected, with the orientation layers facing each other, to form a cell by means of an adhesive which is cured under the influence of ultra-violet light (Norland UV Sealant 91, Norland Products Inc.). Previously, quartz balls having a diameter of 2.4 μm (Catalysts & Chemicals Ind. Co., Ltd.) were spin coated from a suspension in 2-propanol onto one of the two substrates to serve as spacers. The suspension was preferably spin coated onto the substrate having the high surface energy. In this case, the contrast obtained was much higher than that obtained by applying the suspension to the other substrate. In the latter case, the contrast was reduced by more than 50 per cent.

The cell thus obtained was filled, in a vacuum and at an elevated temperature (75° C.), with the DHFLC material FLC-10150 from Hoffmann-La Roche. The cell exhibited an excellent orientation and a homogeneous texture with a good extinction if it was arranged between two crossed polaroids. The contrast upon active matrix drive was above 80. The cell contained only a few line-like defects. The X-ray diffraction pattern measured on the cell exhibited only one diffraction peak, at ≈26°. It follows from these measurements that the smectic layers adopt the "tilted-bookshelf" structure, not the chevron structure.

EXAMPLE 2

The cell examined in this example is almost identical to the one of Example 1. The cell of this example, however, was provided with a different orientation layer having a high surface energy. In this case the polyhexamethylene adipamide (Nylon-6,6) solution was replaced by a 5 wt. % solution of Optmer* AL-1051 (Japan Synthetic Rubber Co.) in γ butyrolactone. Prior to the application of this polyimide, the substrate was pretreated with the adhesion-improving agent γ-aminopropylsilane (Janssen Chemical). The polymer was subsequently spin coated at a rate of 1000 r.p.m. for 5 seconds and next at a rate of 5000 r.p.m. for 30 seconds. Subsequently, the substrate was dried at a temperature of 80° C. for 15 minutes and fired at a temperature of 170° C. for 60 minutes in a vacuum. The approximately 120 nm thick Optmer* AL-1051 layer thus obtained was rubbed in one specific direction with a velvet cloth. The surface energy amounted to 54 mN/m.

The cell was filled, in a vacuum at an elevated temperature (75° C.), with the DHFLC material FLC-10150 from Hoffmann-La Roche . The cell exhibited an excellent orientation and a homogeneous texture with a good extinction. The contrast was above 70. The cell contained only a few line-like defects. The width of these defects, measured where the line-like defect runs parallel to the normal to the layer, was twice the thickness of the cell. The X-ray diffraction pattern of the optically active layer showed only one peak. Consequently, the DHFLC material had the "tilted-bookshelf" structure.

EXAMPLE 3

The cell examined in this example is almost identical to the one of Example 1. The cell of this example, however, was provided with a different orientation layer having a high surface energy. In this case the polyhexamethylene adipamide (Nylon-6,6) solution was replaced by a 0.5 wt. % solution of polyoxyethylene oxyterephtaloyl (polyethylene terephtalate, Aldrich Chemical Co Inc) in o-chlorophenol. Prior to the application of this polyester, the substrate was pretreated with the adhesion-improving agent γ-aminopropylsilane (Janssen Chemnical). The polymer was subsequently spin coated at a rate of 1200 r.p.m. for 40 seconds. Subsequently, the substrate was dried for 16 hours at a temperature of 75° C. The polyester layer thus obtained was rubbed in one specific direction with a velvet cloth. The surface energy amounted to 45 mN/m.

The cell thus obtained was filled, in a vacuum at an elevated temperature (72° C.), with the DHFLC material FLC-9848 from Hoffmann-La Roche. The cell exhibited an excellent orientation and a homogeneous texture with a good extinction. The contrast was above 75. The cell contained only a few line-like defects. The width of these defects, measured where the line-like defect runs parallel to the normal to the layer, was twice the thickness of the cell, which is characteristic of the "tilted-bookshelf" structure. The X-ray diffraction pattern of the optically active layer showed only one peak. Consequently, the DHFLC material had the desired "tilted-bookshelf" structure.

EXAMPLE 4

The cell examined in this example is substantially identical to the one examined in Example 1. The cell of the present example was provided with a different orientation layer having a high surface energy. To this end, the polyhexamethylene adipamide (Nylon-6,6) solution was replaced by a solution of Optmer* AL-3046 (Japan Synthetic Rubber Co.). The solution was used as it was received. The polyimide was spin coated at a rate of 1000 r.p.m. for 5 seconds and next at a rate of 5000 r.p.m. for 30 seconds. Subsequently, the substrate was dried for 15 minutes at a temperature of 80° C. and fired in a vacuum at a temperature of 170° C. for 60 minutes. The 50–100 nm thick Optmer* AL-3046 layer thus obtained was rubbed in one specific direction with a velvet cloth. The surface energy amounted to 52.3 mN/m.

The cell thus obtained was filled, in a vacuum at an elevated temperature (75° C.), with the DHFLC material FLC-10150 from Hoffmann-La Roche . The cell exhibited an excellent orientation and a homogeneous texture with a good extinction. The contrast was above 65. The cell contained only a few line-like defects. The width of these defects, measured where the line-like defect runs parallel to the normal to the layer, was twice the thickness of the cell. The X-ray diffraction pattern of the optically active layer showed only one peak. Consequently, the DHFLC had the desired "tilted-bookshelf" structure.

EXAMPLE 5

The cell examined in this example is substantially identical to the one examined in Example 1. The cell of this example, however, was provided with a different orientation layer having a high surface energy and a pretilt. For this purpose, the polyhexamethylene adipamide (Nylon-6,6)-solution was replaced by a 3 wt. % solution of LQ1800 (Hitachi Chemical) in a mixture of 1-Methyl-2-Pyrrolidinone and 2-butoxyethanol (50/50). The polymer was spin coated at a rate of 1000 r.p.m. for 5 seconds and next at a rate of 4000 r.p.m. for 30 seconds. Subsequently, the substrate was dried for 15 minutes at a temperature of 80° C. and fired in a vacuum at a temperature of 250° C. for 60 minutes. The 35 nm thick LQ1800 layer thus obtained was rubbed in one specific direction with a velvet cloth. The pretilt of the orientation layer was found to be 10°. The surface energy amounted to approximately 40 mN/m.

The cell thus obtained was filled, in a vacuum at an elevated temperature=(75° C.), with the DHFLC material FLC-10150 from Hoffmann-La Roche. The cell exhibited an excellent orientation and a homogeneous texture with a good extinction (contrast above 40). The X-ray diffraction pattern showed only one peak. Thus, the DHFLC had the "tilted-bookshelf" structure. As a result of the pretilt angle induced by the rubbed polyimide, the tilting direction of the smectic layers is the same throughout the display and there are no discernible line-like defects. Said defects can be caused by local differences in the tilting direction of the smectic layers.

EXAMPLE 6

The cell examined in this example is substantially identical to the one examined in Example 1. The only change relates to the type of DHFLC material. In the cell examined in this example, the DHFLC material FLC-10150 was replaced by FLC-9848 (Hoffmann-La Roche). The contrast was above 90. By means of the thickness of the line-like defects, measured where said line-like defects run parallel to the normal to the layer, and by means of the X-ray diffraction pattern of the optically active layer, it could be concluded that the smectic layer structure obtained was of the "tilted-bookshelf" type.

EXAMPLE 7

The cell examined in this example is substantially identical to the one examined in Example 1. The only change relates to the type of DHFLC material. In the cell examined in this example, the DHFLC material FLC-10150 was replaced by FLC-9807 (Hoffmann-La Roche). The contrast was above 60. By means of the thickness of the line-like defects, measured where the line-like defects run parallel to the normal to the layer, and by means of the X-ray diffraction pattern of the optically active layer, it could be concluded that the smectic layer structure obtained was of the "tilted-bookshelf" type.

EXAMPLE 8

The cell examined in this example is substantially identical to the one examined in Example 1. The only change relates to the type of DHFLC material. In the cell examined in this example, the DHFLC material FLC-10150 was replaced by FLC-9264 (Hoffmann-La Roche). The contrast was above 60. By means of the number of measured line-like defects and by means of the X-ray diffraction pattern of the optically active layer, it could be concluded that the smectic layer structure was of the "tilted-bookshelf" type.

From the results of the Examples 6, 7 and 8, it can be concluded that the effect of the invention is achieved independently of the type of DHFLC material. In all of these cases, the contrast was above 60.

In the following comparative examples it will be demonstrated that the desired "tilted-bookshelf" structure is not obtained if the difference in the surface energy of both orientation layers is less than 5 mN/m. In that case, the chevron-smectic layer structure is obtained. This type of structure contains many defects as a result of the stress in the vertex of the chevron.

Comparative Example 1

The cell examined in this example is substantially identical to the one examined in Example 1. In the present example, however, identical orientation layers were used. For this purpose, both the solutions of nylon 6,6 and of polymethylsilsesquioxane of Example 1 were replaced by 5 wt.% solutions of Optmer* AL-1051 (Japan Synthetic Rubber Co.) in γ-butyrolactone. Prior to the application of this polyimide, the substrates were treated with the adhesion-improving agent γ-aminopropylsilane (Janssen Chemical). The polyimide was subsequently spin coated at a rate of 1000 r.p.m. for 5 seconds and next at a rate of 5000 r.p.m. for 30 seconds. Subsequently, the substrates were dried at a temperature of 80° C. for 15 minutes and fired at a temperature of Optmer 170° C. in a vacuum for 60 minutes. The 50–100 nm thick Optmer* AL-1051 layers were rubbed in one specific direction with a velvet cloth. The two substrates were secured to each other in such a manner that both polymer layers were rubbed in the same, parallel directions.

The cell thus obtained was filled, in a vacuum at an elevated temperature (75° C.), with the DHFLC material FLC-10150 from Hoffmann-La Roche. The contrast, measured upon active matrix drive, was approximately 5. The X-ray pattern showed peaks with a high intensity. The cell contained a large number of defects. Said defects were of the type referred to as parallel-zigzag line. The width of the lines, measured where the line-like defects ran parallel to the normal to the smectic layer, was equal to the thickness of the cell. The presence of these lines is related to the chevron-smectic layer structure.

Comparative Example 2

The cell examined in this example is substantially identical to the one examined in comparative example 1, with this difference that only one of the orientation layers was rubbed.

The cell thus obtained was filled, in a vacuum at an elevated temperature (75° C.), with the DHFLC material FLC-10150 from Hoffmann-La Roche. The contrast measured upon active matrix drive was approximately 5. The X-ray pattern showed two peaks with a high intensity. The cell contained a large number of defects. Said defects were of the type referred to as parallel-zigzag line. The width of the lines, measured where the line-like defects ran parallel to the normal to the smectic layer, was equal to the thickness of the cell. The presence of these lines is related to the chevron-smectic layer structure.

Comparative Example 3

The cell examined in this example is substantially identical to the one examined in comparative example 1. In this case, however, the Optmer* AL-1051 solution was replaced by an 1 wt. % solution of silicon-containing poly(vinyl alcohol) (Kuraray Co. Ltd.) in water. The polymer layer was spin coated at a rate of 2000 r.p.m. for 15 seconds. Subsequently, the 30 nm thick layer was dried at a temperature of 175° C.

The cell thus obtained, which had identical orientation layers, was filled, in a vacuum at an elevated temperature (75° C.), with the DHLFC-material FLC-10150 from Hoffmann-La Roche. The contrast, measured upon active matrix drive, was approximately 5. The X-ray pattern showed two peaks with a high intensity. The cell contained a large number of defects. The defects were of the type referred to as parallel-zigzag line. The width of the lines, measured where the line-like defects ran parallel to the normal to the smectic layer, was equal to the thickness of the cell. The presence of these lines is related to the chevron-smectic layer structure.

Comparative Example 4

The cell examined in this example is substantially identical to the one examined in comparative example 3. In this case, however, only one of the applied silicons containing poly(vinyl alcohol) layers (Kuraray Co. Ltd.) was rubbed.

The cell thus obtained was filled, in a vacuum at an elevated temperature (75° C.), with the DHFLC material FLC-10150 from Hoffmann-La Roche. The contrast, measured upon active matrix drive, was approximately 5. The X-ray pattern showed 2 peaks with a high intensity. The cell contained a large number of defects. The defects were of the type referred to as parallel-zigzag line. The width of the lines, measured where the line-like defects ran parallel to the normal to the smectic layer, was equal to the thickness of the cell. The presence of these lines is related to the chevron-smectic layer structure.

Comparative Example 5

The cell examined in this example is substantially identical to the one examined in comparative example 1. In this case, however, the DHFLC material FLC-10150 was replaced by the DHFLC material FLC-9848 (Hoffmann-La Roche). The cell contained a large number of defects. The defects were of the type referred to as parallel-zigzag line. The contrast was approximately 5. By means of the X-ray diffraction pattern of the optically active layer and by means of the thickness and shape of the line-like defects, it could be concluded that the smectic layer structure was of the chevron type.

Comparative Example 6

The cell examined in this example is substantially identical to the one examined in comparative example 1. In this case, however, the DHFLC material FLC-10150 was replaced by the DHFLC material FLC-9807 (Hoffmann-La Roche). The cell contained a large number of defects. The defects were of the type referred to as parallel-zigzag line. The contrast was approximately 5. By means of the X-ray diffraction pattern of the optically active layer and by means of the thickness and shape of the line-like defects, it could be concluded that the smectic layer structure was of the chevron type.

Comparative Example 7

The cell examined in this example is substantially identical to the one examined in comparative example 1. In this case, however, the DHFLC material FLC-10150 was replaced by the DHFLC material FLC-9264 (Hoffmann-La Roche). The cell contained a large number of defects. The defects were of the type referred to as parallel-zigzag line. The contrast was approximately 5. By means of the X-ray diffraction pattern of the optically active layer and by means of the thickness and shape of the line-like defects, it could be concluded that the smectic layer structure was of the chevron type.

Comparative examples 5, 6 and 7 show that for achieving the inventive effect, variation of the type of DHFLC material has no influence.

Comparative Example 8

The cell examined in this example is substantially identical to the one examined in comparative example 1. In this case, however, identical orientation layers of Nylon 6,6 were used. To this end, two substrates patterned with ITO were coated with a 0.5 wt. % solution of polyhexamethylene adipamide (Nylon-6,6; Aldrich Chemical Co.) in methanoic acid. The substrates were spin coated at a rate of 1200 r.p.m. for 40 minutes and subsequently fired at 75° C. for 16 hours. The approximately 40 nm thick Nylon-6,6 layers thus obtained were rubbed in one specific direction with a velvet cloth. Both substrates were secured to each other by means of an UV-curable adhesive (Norland UV Sealant 91, Norland Products Inc.), the direction of rubbing of the two polymer layers being parallel and the same. The desired interspace of 2.4 micrometers between the substrates was maintained by means of quartz balls having a diameter of 2.4 micrometers which were provided from a suspension in 2-propanol on to one of the two substrates.

The cell thus obtained was filled, in a vacuum at an elevated temperature (72° C.), with the DHFLC material FLC-9848 from Hoffmann-La Roche. The contrast, measured upon active matrix drive, was approximately 13. The cell contained a large number of line-like defects which are characteristic of the chevron-smectic layer structure. The X-ray pattern corresponded thereto.

Comparative Example 9

The cell examined in this comparative example is substantially identical to the one examined in comparative example 8. In this comparative example, the coupled substrates were rubbed in substantially anti-parallel directions. The cell thus obtained was filled, in a vacuum at an elevated temperature (72° C.), with the DHFLC material FLC-9848 from Hoffmann-La Roche. The contrast, measured upon active matrix drive, was approximately 16. The cell contained a large number of line-like defects which are characteristic of the chevron-smectic layer structure. The X-ray pattern corresponded thereto

Comparative Example 10

The cell examined in this comparative example is substantially identical t the one examined in comparative example 8. In this comparative example, however, identical orientation layers composed of different materials were used. For this purpose, two substrates patterned with ITO were covered with a 6 wt. % solution of polymethylsilsesquioxane (ABCR GmbH & Co.) in 1-butanol. The substrates were spin coated at a rate of 4000 r.p.m. for 20 minutes and next fired at 75° C. for 16 hours. The polymethylsilsesquioxane-containing substrates thus obtained were secured to each other by means of an UV-curable adhesive (Norland UV Sealant 91, Norland Products Inc.). The desired space of 2.4 micrometers between the unrubbed substrates was maintained by means of quartz balls having a diameter of 2.4 micrometers, which were provided from a suspension in 2-propanol on to one of the two substrates.

The cell thus obtained was filled, in a vacuum at an elevated temperature (72° C.), with the DHFLC material FLC-9848 from Hoffmann-La Roche. The liquid-crystalline material had an arbitrary, smectic, focal-conical structure and could not be brought to extinction if it was provided between two crossed polarizers (contrast approximately 0). The orientation of the liquid-crystalline material was arbitrary.

Comparative Example 11

The cell construction in this example is substantially identical to that in Example 1. In this comparative example, however, quartz balls having a diameter of 16 μm (Catalysts & Chemicals Ind. Co., Ltd.) were used. In addition, the DHFLC material FLC 10150 was replaced by the SSFLC-material ZLI 4655-000 (Merck Ltd.).

Unlike the results of example 1, it was found that the optically active layer made from the cell comprising the SSFLC-material adopts the chevron structure. The presence of the chevron structure was derived from the presence and the shape of the zigzag defects. The X-ray pattern corresponded thereto.

Comparative Example 12

The cell construction in this example is almost identical to that of example 1. In this comparative example, however, quartz balls having a diameter of 1.6 μm (Catalysts & Chemicals Ind. Co., Ltd.) were used. In addition, the DHFLC material FLC10150 was replaced by the SSFLC-material CS 1014 (Chisso Corporation).

Unlike the results of example 1, it was found that the optically active layer made from the cell comprising the SSFLC-material adopts the chevron structure. The presence of the chevron structure was derived from the presence and the shape of the zigzag defects and the X-ray pattern of the optically active layer.

From the results of comparative examples 11 and 12 it can be concluded that a difference in the surface energy of the orientation layers does not eliminate the chevron structure in optically active layers of SSFLC-material.

The present invention provides optical modulation devices and displays of the DHFLC type having a high contrast. These modulation devices comprise a first substrate and a second substrate which are substantially parallel to each other and which are provided, on their facing surfaces, with, in succession, an electrode layer and an orientation layer. This advantageous effect is achieved by using different orientation layers, the surface energy of the orientation layer of the first substrate differing from the surface energy of the orientation layer of the second substrate, said difference in surface energy being at least 5 mN/m. The orientation layer having the high surface energy is preferably made of rubbed polyimide, and the orientation layer having the low surface energy is preferably made of unrubbed polyorganosilsesquioxane. The optically active layer of the modulation devices in accordance with the invention exhibits a "tilted-bookshelf" structure.

I claim:

1. Optical modulation device comprising a first substrate and a second substrate which are positioned substantially parallel to each other and the facing surfaces of which are provided, in succession, with an electrode layer and an orientation layer, an optically active layer of distorted-helix ferroelectric liquid-crystalline material being present between the two substrates, characterized in that the surface energy of the orientation layer of the first substrate differs from the surface energy of the orientation layer of the second substrate, and in that said difference in surface energy is at least 5 mN/m.

2. An optical modulation device as claimed in claim 1, characterized in that the orientation layer of the first substrate is made from a material having a high surface energy of at least 30 mN/m, and in that the orientation layer of the second substrate consists of a layer having a low surface energy of maximally 25 mN/m.

3. An optical modulation device as claimed in claim 2, characterized in that the orientation layer having the high surface energy is made from rubbed polyimide.

4. An optical modulation device as claimed in claim 2, characterized in that the orientation layer having the low surface energy is made from unrubbed polyorganosilsesquioxane.

5. An optical modulation device as claimed in claim 1, characterized in that the orientation layer having the high surface energy is made from rubbed polyimide.

6. An optical modulation device as claimed in claim 5, characterized in that the rubbed polyimide also induces a pretilt angle in the liquid-crystalline material.

7. An optical modulation device as claimed in claim 6, characterized in that the orientation layer having the low surface energy is made from unrubbed polyorganosilsesquioxane.

8. An optical modulation device as claimed in claim 5, characterized in that the orientation layer having the low surface energy is made from unrubbed polyorganosilsesquioxane.

9. An optical modulation device as claimed in claim 1, characterized in that the orientation layer having the low surface energy is made from unrubbed polyorganosilsesquioxane.

10. An DHFLC display, comprising an optical modulation device as claimed in claim 1 as well as at least one polarizer and means for driving the optically active layer.

* * * * *